(12) United States Patent
Itoh et al.

(10) Patent No.: US 7,846,868 B2
(45) Date of Patent: Dec. 7, 2010

(54) HONEYCOMB-SHAPED STRAIGHT-FLOW STRUCTURE FOR CATALYST AND CATALYST FOR PURIFYING EXHAUST GASES

(75) Inventors: Yusuke Itoh, Nissin (JP); Toshihiro Takada, Toyota (JP); Tatsuji Mizuno, Nagoya (JP); Yoshiharu Miyake, Aichi-ken (JP); Yoshihide Segawa, Kariya (JP)

(73) Assignees: Toyota Jidosha Kabushiki Kaisha, Toyota-shi, Aichi-ken (JP); Denso Corporation, Kariya, Aichi-pref (JP)

( * ) Notice: Subject to any disclaimer, the term of this patent is extended or adjusted under 35 U.S.C. 154(b) by 64 days.

(21) Appl. No.: 11/808,888

(22) Filed: Jun. 13, 2007

(65) Prior Publication Data

US 2008/0004174 A1    Jan. 3, 2008

(30) Foreign Application Priority Data

Jun. 13, 2006    (JP) .............................. 2006-163514

(51) Int. Cl.
*B01J 21/04* (2006.01)

(52) U.S. Cl. ........................ 502/439; 423/624; 502/102

(58) Field of Classification Search ................ 502/102, 502/300, 439, 73; 423/624–631; *H01R 43/00, H01R 12/18; B08B 01/00; H01D 53/84, H01D 39/14, 39/20; H01J 35/04*
See application file for complete search history.

(56) References Cited

U.S. PATENT DOCUMENTS

| | | | | |
|---|---|---|---|---|
| 5,744,103 | A * | 4/1998 | Yamada et al. .............. | 422/171 |
| 5,855,781 | A * | 1/1999 | Yorita et al. ........... | 210/321.82 |
| 6,764,743 | B2 * | 7/2004 | Kato et al. ................... | 428/118 |
| 2003/0083193 | A1 * | 5/2003 | Takaya et al. ............... | 502/304 |
| 2003/0176280 | A1 * | 9/2003 | Caze et al. .................. | 502/439 |
| 2004/0176246 | A1 * | 9/2004 | Shirk et al. ................. | 502/439 |
| 2004/0177600 | A1 * | 9/2004 | Ichikawa et al. .............. | 55/523 |
| 2004/0254073 | A1 * | 12/2004 | Wei et al. ............... | 502/527.12 |
| 2005/0031501 | A1 * | 2/2005 | Kawai et al. ................ | 422/180 |
| 2005/0120690 | A1 * | 6/2005 | Noguchi et al. ............... | 55/523 |

FOREIGN PATENT DOCUMENTS

| | | |
|---|---|---|
| JP | 09-313843 | 12/1997 |
| JP | 2000-051710 | 2/2000 |
| JP | 2001-162177 | 6/2001 |
| JP | 2003-024726 | 1/2003 |
| JP | 2003-025316 | 1/2003 |
| JP | 2003-225540 | 8/2003 |
| JP | 2004-000838 | 1/2004 |
| JP | 2004-000907 | 1/2004 |
| JP | 2004-270569 | 9/2004 |
| WO | WO 03/082437 | 10/2003 |
| WO | WO 2006041174 A1 * | 4/2006 |

* cited by examiner

*Primary Examiner*—Stuart Hendrickson
*Assistant Examiner*—Richard M Rump
(74) *Attorney, Agent, or Firm*—Finnegan, Henderson, Farabow, Garrett & Dunner, LLP

(57) ABSTRACT

A honeycomb-shaped substrate for catalyst is made from ceramic, has a straight-flow structure, and includes cellular walls exhibiting pore volumes, which differ partially, and a large number of cellular passages demarcated by the cellular walls. A catalyst for purifying exhaust gases is produced by providing the cellular walls of the honeycomb-shaped substrate with a catalytic coating layer.

20 Claims, 1 Drawing Sheet

Larger-pore-volume Portion 11
Smaller-pore-volume Portion 12

Larger-pore-volume Portion 11
Smaller-pore-volume Portion 12

HONEYCOMB-SHAPED STRAIGHT-FLOW STRUCTURE FOR CATALYST AND CATALYST FOR PURIFYING EXHAUST GASES

BACKGROUND OF THE INVENTION

1. Field of the Invention

The present invention relates to a honeycomb-shaped substrate, which is used for catalysts for purifying automotive exhaust gases, and a catalyst for purifying exhaust gases, catalyst which uses the honeycomb-shaped substrate.

2. Description of the Related Art

In catalysts for purifying exhaust gases, such as three-way catalysts, which have been employed in automobiles, a highly heat resistant honeycomb-shaped substrate, which is made from ceramic, such as cordierite, has been used. The honeycomb-shaped substrate comprises cellular walls, and a large number of cellular passages, which are demarcated by the cellular walls. On a surface of the cellular walls, a catalytic coating layer is formed. The catalytic coating layer is made by loading a catalytic ingredient, such as platinum, on a porous support powder, such as a γ-alumina powder, and thereby the honeycomb-shaped substrate is used as a catalyst for purifying exhaust gases.

The resulting catalyst for purifying exhaust gases produces a great contacting area between the catalytic ingredient and exhaust gases, because exhaust gases distribute through the cellular passages whose peripheral walls are provided with the catalytic coating layer. Thus, the exhaust-gases-purifying catalyst exhibits extremely good purifying conversions.

In order to form the catalytic coating layer, the following method has been employed in general. An oxide support powder is turned into a slurry along with a binder and water. After filling the resultant slurry into the cellular walls of the honeycomb-shaped substrate, the excessive slurry is discharged out of the honeycomb-shaped substrate, and thereafter the honeycomb-shaped substrate is calcined. Then, a catalytic ingredient is loaded on the thus formed coating layer. Recently, however, such a method has become commonplace that a slurry is prepared using a catalytic powder, which is made by loading a catalytic ingredient on an oxide support powder in advance; and then the resulting slurry is coated on a honeycomb-shaped substrate.

However, by means of the above-described so-called wash coating method, a coating layer which has a uniform thickness has been formed on a honeycomb-shaped substrate entirely. When a catalytic coating layer with a uniform thickness is formed on a honeycomb-shaped substrate, the temperature of the honeycomb-shaped substrate's exhaust-gas-flow upstream portion has become high temperatures locally in service as a catalyst for purifying exhaust gases. Accordingly, the resultant exhaust-gases-purifying catalyst might be associated with a problem that the durability has deteriorated considerably.

Namely, a catalyst for purifying exhaust gases is likely to exhibit high temperatures on the inlet side into which high-temperature exhaust gases flow. Moreover, since the reaction heat, which results from reactions on the inlet side, propagates to the exhaust-gases-purifying catalyst's exhaust-gas-flow downstream side, reactions, which are similar to the inlet-side reactions, take place on the exhaust-gas-flow downstream side as well. The phenomenon is advantageous in view of the purifying performance in a low-temperature region. However, in a temperature region where the temperatures are higher than a catalytic ingredient's activation temperature, the reaction heat, which derives from the reaction on the exhaust-gas-flow upstream side, becomes less likely to dissipate. Consequently, the catalytic ingredient has undergone a granular growth, and the like, especially on the exhaust-gas-flow upstream side so that the exhaust-gases-purifying catalyst might exhibit considerably deteriorated durability.

In order to inhibit the above-described problem, it is possible to make the loading amount of a catalytic ingredient less on the exhaust-gas-flow upstream side of the exhaust-gases-purifying catalyst and make it more on the exhaust-gas-flow downstream side thereof. If such is the case, however, the resultant exhaust-gases-purifying catalyst might have such a problem that the ignitability has degraded and the low-temperature purifying performance has degraded because it exhibits degraded reaction activities on the exhaust-gas-flow upstream side. Moreover, by means of the wash coating method in which a slurry, which is made by using a catalytic powder with a catalytic ingredient loaded on an oxide support powder in advance, is wash coated onto a honeycomb-shaped substrate, it is difficult to make the loading amount of the catalytic ingredient on the exhaust-gas-flow upstream side different from that on the exhaust-gas-flow downstream side, because the resulting coating layer is formed in a uniform thickness so that the catalytic ingredient has been loaded in a uniform loading amount.

Moreover, Japanese Unexamined Patent Publication (KOKAI) Gazette No. 2004-838 discloses a catalyst for purifying exhaust gases, catalyst which comprises an upstream-side coating layer and a downstream-side coating layer. The upstream-side coating layer includes $Al_2O_3$ whose pore volume is 0.6 c.c./g or less, and is formed on an exhaust-gas-flow upstream portion of the catalyst. The downstream-side coating layer includes $Al_2O_3$ whose pore volume is 0.8 c.c./g or less, and is formed on an exhaust-gas-flow downstream portion of the catalyst.

The conventional catalyst disclosed in the gazette exhibits a high thermal conductivity, because the upstream-side coating layer has a dense structure. Moreover, the heat of exhaust gases are transmitted quickly to the downstream-side coating layer, because the densified upstream-side coating layer is disposed on an exhaust-gas-flow upstream side of the catalyst. Accordingly, the conventional catalyst can purify hydrocarbons (hereinafter abbreviated to "HCs") even from a low-temperature region, because it is good in terms of the temperature increment characteristic. In addition, the downstream-side coating layer in which Pd is loaded on $Al_2O_3$ whose pore volume is 0.8 c.c./g or less is good in terms of the gas diffusability so that HCs diffuse quickly, because it exhibits a large pore volume. Consequently, the conventional catalyst shows good conversions.

Such a coating operation as coating the upstream-side coating layer and downstream-side coating layer dividedly can be carried out as follows. First of all, a first slurry is filled into a honeycomb-shaped substrate by a predetermined depth from one of the honeycomb-shaped substrate's opposite ends on down. The excessive slurry is removed by suction through the one of the honeycomb-shaped substrate's opposite ends, thereby forming a first coating layer. Then, the resulting first coating layer is dried and/or calcined. Subsequently, a second slurry is filled into the honeycomb-shaped substrate by another predetermined depth from the other one of the honeycomb-shaped substrate's opposite ends on down. The excessive slurry is removed by suction through the other one of the honeycomb-shaped substrate's opposite ends, thereby forming a second coating layer. Then, the resulting second coating layer is dried and/or calcined. Moreover, in this method, it is possible to make the thickness of the upstream-side coating layer different from that of the downstream-side coating layer by making the viscosity of the first slurry different from that of the second slurry, for instance.

However, in the above-described method, it is needed to repeatedly carry out the coating step and the drying-and/or-calcining step several times. The method might have a problem in that the man-hour requirements have been excessive.

In addition, Japanese Unexamined Patent Publication (KOKAI) Gazette No. 2003-225,540 discloses an apparatus for purifying exhaust gases, apparatus which comprises a diesel particulate filter (hereinafter abbreviated to as "DPF") on which a catalytic coating layer is formed. The DPF exhibits a larger average pore diameter on the exhaust-gas-flow upstream side, and exhibits a smaller average pore diameter on the exhaust-gas-flow downstream side. However, the DPF is formed as wall-flow structure, and has cellular walls whose pore diameters are about some dozens of micrometers in order to collect particulate matters in exhaust gases. Therefore, it is not possible to establish the present invention using a honeycomb-shaped substrate with such large pores.

SUMMARY OF THE INVENTION

The present invention has been developed in view of the aforementioned circumstances. It is therefore an object of the present invention to provide a novel honeycomb-shaped substrate, which comprises a catalytic coating layer whose thickness can be controlled at will by means of a single wash coating operation.

A honeycomb-shaped substrate according to the present invention for catalyst can solve the aforementioned problems, is made from ceramic, has a straight-flow structure, and comprises:

cellular walls exhibiting pore volumes, which differ partially; and a large number of cellular passages demarcated by the cellular walls.

In present honeycomb-shaped substrate, the pore volumes can preferably be exhibited by fine pores whose pore diameters are 2 μm or less.

In the present honeycomb-shaped substrate, the cellular walls can preferably exhibit the pore volumes, which have different pore volume distributions in an axial direction or a diametric direction of the honeycomb-shaped substrate.

Moreover, a catalyst according to the present invention for purifying exhaust gases comprises:

the present honeycomb-shaped substrate; and a catalytic coating layer, which is formed on the cellular walls of the present honeycomb-shaped substrate by a wash coating method, and on which a catalytic ingredient is loaded.

In present catalyst, the cellular wall can preferably exhibit pore volumes, which are greater on an exhaust-gas-flow upstream side of the present honeycomb-shaped substrate than on an exhaust-gas-flow downstream side thereof; and the catalytic coating layer can preferably have thicknesses, which are thicker on an exhaust-gas-flow upstream side of the present honeycomb-shaped substrate than on an exhaust-gas-flow downstream side thereof. Note that it is more preferable that the pore volumes can be greater on an exhaust-gas-flow upstream side of the present honeycomb-shaped support than on an exhaust-gas-flow downstream side thereof by a factor of from 1.2 to 5 times, much more preferably by a factor of from 1.5 to 3 times. Moreover, it is more preferable that the thickness on an exhaust-gas-flow upstream side of the present honeycomb-shaped support can be thicker than the thickness on an exhaust-gas-flow downstream side thereof by a factor of from 1.5 to 4 times, much more preferably by a factor of from 1.8 to 2.5 times.

The present honeycomb-shaped substrate comprises the cellular walls exhibiting pore volumes, which differ partially. When a slurry is wash coated onto the present honeycomb-shaped substrate, the resulting coating layer becomes thicker at parts of the present honeycomb-shaped substrate which exhibit larger pore volumes, and becomes thinner at parts of the present honeycomb-shaped substrate which exhibit smaller pore volumes. Therefore, it is possible to provide the resultant coating layer with thickness distributions by means of a single wash coating operation. Moreover, it is feasible to control the thickness of the resulting coating layer at will by means of adjusting the pore volumes, which the cellular walls exhibit.

Moreover, by means of adjusting the pore volumes which fine pores having 2-μm-or-less pore diameters exhibit, it is possible to control the thickness of the resultant coating layer with much higher accuracy.

In addition, by means of adjusting the pore volumes so as to provide the cellular walls with pore volume distributions which differ in an axial direction or a diametric direction of the present honeycomb-shaped substrate, it is possible to make the thickness of the resulting catalytic coating layer different in an axial direction or a diametric direction of the present honeycomb-shaped substrate. Accordingly, it is possible to readily optimize the purifying performance or durability of the resultant exhaust-gases-purifying catalyst in an axial direction or a diametric direction of the present honeycomb-shaped substrate. For example, when making the cellular walls of the present honeycomb-shaped substrate exhibit pore volumes, which are greater on an exhaust-gas-flow upstream side of the present honeycomb-shaped substrate than on an exhaust-gas-flow downstream side thereof, the resulting catalytic coating layer has thicknesses, which are thicker on an exhaust-gas-flow upstream side of the present honeycomb-shaped substrate than on an exhaust-gas-flow downstream side thereof. As a result, the amount of reaction heat generating on an exhaust-gas-flow downstream side of the resultant exhaust-gases-purifying catalyst becomes less. Consequently, the heat generating on an exhaust-gas-flow upstream side of the resulting exhaust-gases-purifying catalyst becomes likely to dissipate to an exhaust-gas-flow downstream side thereof. Therefore, it is possible to inhibit the exhaust-gas-flow upstream side from deteriorating thermally. Thus, the resultant exhaust-gases-purifying catalyst exhibits improved purifying performance even after being subjected to durability process.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
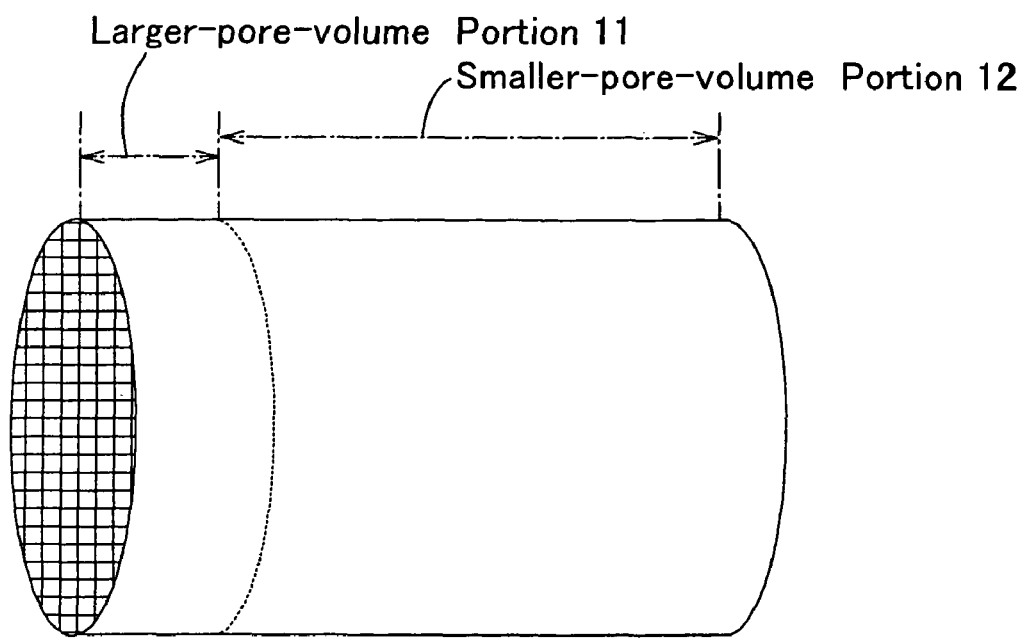
FIG. 1 is a perspective diagram for illustrating a honeycomb-shaped substrate according to Example No. 1 of the present invention.

Having generally described the present invention, a further understanding can be obtained by reference to the specific preferred embodiments which are provided herein for the purpose of illustration only and not intended to limit the scope of the appended claims.

A honeycomb-shaped substrate according to the present invention is made from ceramic, and is formed as a straight-flow structure. Moreover, the present honeycomb-shaped substrate comprises cellular walls, and a large number of cellular passages. The cellular walls demarcate the cellular passages. As for the ceramic, it is possible to use cordierite, silicon nitride and silicon carbide. The present honeycomb-shaped substrate is usually formed by extruding a clayey compound and then followed by calcination.

One of the major characteristics of the present honeycomb-shaped substrate lies in that the cellular walls exhibit pore volumes, which differ partially. In order to make the pore volumes different partially, the following method is available: a compound whose composition differs partially is extruded; and then the resulting extruded product is calcined. For example, when a rod-shaped compound, which comprises an outer periphery and an inner periphery made of ceramic powders with different particle diameters, respectively, is extruded through a predetermined die; and then the resultant extruded product is calcined, it is possible to provide the present honeycomb-shaped substrate with pore volumes, which differ between the outer periphery and the inner periphery. Moreover, it is advisable as well to employ a compound in which the addition amounts of sintering auxiliary agent or the presence/absence thereof differ partially.

Moreover, it is possible as well to make pore volumes, which the cellular walls exhibit, different partially by extruding a compound with a uniform composition, drying the resulting extruded product afterward, and impregnating the dried extruded product with a sintering facilitating agent locally; and then followed by calcining the extruded product being subjected to the impregnation. If such is done, it is possible to make parts of the present honeycomb-shaped substrate, which are impregnated with a sintering facilitating agent, exhibit smaller pore volumes than the other parts, which are free of the impregnation, do. Therefore, it is possible to make the cellular walls of the present honeycomb-shaped substrate exhibit different pore volumes in an axial direction of the present honeycomb-shaped substrate, that is, in an exhaust-gas-flow direction thereof.

In the present honeycomb-shaped substrate, the pore volumes can preferably be exhibited by fine pores whose pore diameters are 2 μm or less. Note that it is not practical to make the pore volumes, which are exhibited by fine pores whose pore diameters are more than 2 μm, different, because the changing degree of the resulting catalytic coating layer's thickness is less. Moreover, if such is the case, the relationship between the pore volumes and the resultant catalytic coating layer's thickness has become inexplicit. By means of making the pore volumes, which are exhibited by fine pores whose pore diameters are 2 μm or less, different, not only it is possible to provide the resulting catalytic coating layer with a large thickness difference axially or diametrically, but also it is possible to establish a substantially proportional relationship between the pore volumes and the resultant catalytic coating layer's thickness. Therefore, it is possible to control the resulting catalytic coating layer's thickness with high accuracy.

A catalyst according to the present invention for purifying exhaust gases comprises the present honeycomb-shaped substrate, and a catalytic coating layer. The catalytic coating layer is formed on the cellular walls of the present honeycomb-shaped substrate by a wash coating method, and is provided with a catalytic ingredient loaded thereon. For example, the catalytic coating layer comprises an oxide support, and a catalytic ingredient. As for the oxide support, it is possible to employ at least one member of porous oxides being selected from the group consisting of alumina, zirconia, titania, silica and ceria; or at least one member of porous oxides being selected from the group consisting of composite oxides, which are made from these oxides. Moreover, as for the catalytic ingredient, it is possible to exemplify at least one member selected from the group consisting of noble metals, transition metals and $NO_x$-sorbing metals. The noble metals can be Pt, Rh, Pd, and Ir. The transition metals can be Fe, Cu, Co, and W. The $NO_x$-sorbing metals can be alkali metals, and alkaline-earth metals.

The catalytic coating layer is formed by a wash coating method using a slurry. For example, the catalytic coating layer can be formed as follows: a slurry, which comprises an oxide support powder, a binder and a solvent, is wash coated onto the present honeycomb-shaped substrate; the present honeycomb-shaped substrate, which has undergone the wash coating, is dried and/or calcined; and then a catalytic ingredient is loaded onto the honeycomb-shaped substrate. Alternatively, the catalytic coating layer can be formed as described below: a slurry, which comprises a catalytic powder with a catalytic ingredient loaded in advance onto an oxide support powder, a binder and a solvent, is wash coated onto the present honeycomb-shaped substrate; and then the present honeycomb-shaped substrate, which has undergone the wash coating, is dried and/or calcined.

As for the solvent for the slurry, although water is usually employed, it is possible to use mixture solvents of water and alcohols, which mix with water compatibly. Depending on cases, it is possible to use other organic solvents. Moreover, the binder not only binds an oxide support powder with the present honeycomb-shaped substrate, but also binds the particulates of oxide support powder with each other. As for the binder, it is possible to employ binders, which have been used conventionally, such as aluminum nitrate, zirconium nitrate, alumina sol and zirconia sol.

It is believed that, in cellular walls which exhibit large pore volumes, the water content in a slurry permeates into the cellular walls' pores to increases the slurry's viscosity. Accordingly, the resulting catalytic coating layer's thickness becomes thicker, because the slurry adheres more onto the cellular walls. On the contrary, in cellular walls which exhibit small pore volumes, the resultant catalytic coating layer's thickness becomes thinner, because the slurry's viscosity increases so slightly that the slurry adheres less onto the cellular walls. Therefore, it is possible to make the resulting catalytic coating layer's thickness different partially by means of a single wash coating operation.

Note that, when using a slurry, which comprises a catalytic powder with a catalytic ingredient loaded in advance onto an oxide support powder, a binder and a solvent, it is possible as well to make the loaded amount of the catalytic ingredient different depending on the resulting catalytic coating layer's thickness distributions. Hence, the present exhaust-gases-purifying catalyst also exhibits enhanced purifying activities at parts, which are provided with the catalytic coating layer having thicker thicknesses, because the parts possess the loaded catalytic ingredient abundantly.

EXAMPLES

The present honeycomb-shaped substrate will be hereinafter described in more detail with reference to specific examples and comparative examples.

Example No. 1

Using a compound whose major component was a cordierite powder, a honeycomb-shaped molded workpiece was produced by extrusion molding. The resulting molded workpiece was dried to obtain a dried workpiece. Then, the dried workpiece was immersed into an aqueous solution of an alkaline sintering facilitating agent over a range of 41 mm by depth from one of the opposite end surfaces on down. After impregnating the dried workpiece's cellular walls, which were present over the range, with the aqueous solution, the impregnated workpiece was taken up from the aqueous solution, and was then calcined at 1,400° C. for 5 hours. Thus, a honeycomb-shaped substrate according to Example No. 1 of the present invention was produced. The resultant honeycomb-shaped substrate according to Example No. 1 had a diameter of 35 mm, a length of 50 mm, cross-sectionally-quadrangled cells in a quantity of 600 cells per square inch, and a cellular wall thickness of 90 μm.

The thus produced honeycomb-shaped substrate according to Example No. 1 of the present invention was measured for pore volumes with a mercury porosimeter. Note the measured pore volumes were exhibited by fine pores, whose pore diameters were 2 μm or less and which were present in the cellular walls falling in the range being impregnated with the aqueous solution and in the cellular walls falling in the range being not subjected to the impregnation. Table 1 below sets forth the measurement results. Specifically, as illustrated in FIG. 1, the honeycomb-shaped substrate according to Example No. 1 was provided with a larger-pore-volume portion 11 and a smaller-pore-volume portion 12. The larger-pore-volume portion 10 was formed over a 9-mm-length range from one of the opposite end surfaces of the honeycomb-shaped substrate according to Example No. 1, and exhibited a pore volume of 0.118 c.c./g. The smaller-pore-volume portion 12 was formed over the remaining 41-mm-length range from the downstream-side end of the larger-pore-volume portion 11 to the other one of the opposite end surfaces of the honeycomb-shaped substrate according to Example No. 1, and exhibited a pore volume of 0.075 c.c./g.

Subsequently, 150 parts by weight of a ceria-based composite oxide powder, 80 parts by weight of a zirconia-based composite oxide powder, 4 parts by weight of an alumina powder, 200 parts by weight of an alumina sol, 6 parts by weight of acetic acid, and 20 parts by weight of water were mixed by stirring. The resulting mixture was subjected to milling with a ball mill, thereby preparing a slurry.

The thus prepared slurry was wash coated onto the honeycomb-shaped substrate according to Example No. 1 of the present invention. After removing the excessive slurry from the honeycomb-shaped substrate according to Example No. 1 by blowing air to it, the honeycomb-shaped substrate was dried at 120° C. for 6 hours, and was then calcined at 400° C. for 3 hours, thereby forming a coating layer. The coating layer was formed in an amount of 270 g per 1-L volume of the honeycomb-shaped substrate according to Example No. 1. Subsequently, using a dinitrodiammine platinum aqueous solution and a rhodium chloride aqueous solution, Pt and Rh were loaded onto the coating layer by water absorption, thereby forming a catalytic coating layer. Pt was loaded in an amount of 1 g per 1-L volume of the honeycomb-shaped substrate according to Example No. 1, and Rh was loaded in an amount of 0.2 g per 1-L volume of the honeycomb-shaped substrate according to Example No. 1.

The resulting catalyst was measured for the catalytic coating layer's thicknesses. Note that the catalytic coating layer's thicknesses were measured at 10 locations in the flats of the cellular walls in each of the larger-pore-volume portion 11 and smaller-pore-volume portion 12 of the honeycomb-shaped substrate according to Example No. 1 of the present invention. Table 1 below sets forth the averaged values of the measured catalytic coating layer's thicknesses.

Example Nos. 2 and 3

Except that the concentration of the aqueous solution's alkaline sintering facilitating agent was changed, and that the length of the dried workpiece being immersed into the aqueous solution was changed, honeycomb-shaped substrates according to Example Nos. 2 and 3 of the present invention were produced in the same manner as described in Example No. 1. The resulting honeycomb-shaped substrates according to Example Nos. 2 and 3 were measured for the pore volumes, which were exhibited by fine pores whose pore diameters were 2 μm or less and which were present in the cellular walls, with a mercury porosimeter. Table 1 below sets forth the measured pore volumes.

Subsequently, the honeycomb-shaped substrates according to Example Nos. 2 and 3 of the present invention were provided with a catalytic coating layer in the same manner as described in Example No. 1. Then, the thus produced catalysts were measured for the resulting catalytic coating layer's thicknesses at 10 locations in the flats of the cellular walls in each of the larger-pore-volume portion 11 and smaller-pore-volume portion 12 of the honeycomb-shaped substrates according to Example Nos. 2 and 3 in the same manner as described in Example No. 1. Table 1 below sets forth the averaged values of the measured catalytic coating layer's thicknesses.

Comparative Example No. 1

Except that the resulting honeycomb-shaped substrate was not impregnated with the aqueous solution of an alkaline sintering facilitating agent, a honeycomb-shaped substrate according to Comparative Example No. 1 was produced in the same manner as described in Example No. 1. The resultant honeycomb-shaped substrate according to Comparative Example No. 1 was measured for the pore volumes, which were exhibited by fine pores whose pore diameters were 2 μm or less and which were present in the cellular walls, with a mercury porosimeter. Table 1 below sets forth the measured pore volume.

Subsequently, the honeycomb-shaped substrate according to Comparative Example No. 1 was provided with a catalytic coating layer in the same manner as described in Example No. 1. Then, the thus produced catalyst was measured for the resulting catalytic coating layer's thicknesses at 10 locations in the flats of the cellular walls in the same manner as described in Example No. 1. Table 1 below sets forth the averaged value of the measured catalytic coating layer's thicknesses.

Comparative Example No. 2

Except that the resulting dried workpiece was impregnated with the aqueous solution of an alkaline sintering facilitating agent over the entire length, a honeycomb-shaped substrate according to Comparative Example No. 2 was produced in the same manner as described in Example No. 1. The resultant honeycomb-shaped substrate according to Comparative Example No. 2 was measured for the pore volumes, which were exhibited by fine pores whose pore diameters were 2 μm or less and which were present in the cellular walls, with a mercury porosimeter. Table 1 below sets forth the measured pore volume.

Subsequently, the honeycomb-shaped substrate according to Comparative Example No. 2 was provided with a catalytic coating layer in the same manner as described in Example No. 1. Then, the thus produced catalyst was measured for the resulting catalytic coating layer's thicknesses at 10 locations in the flats of the cellular walls in the same manner as described in Example No. 1. Table 1 below sets forth the averaged value of the measured catalytic coating layer's thicknesses.

Examination and Evaluation

The respective catalysts according to Example Nos. 1 through 3 of the present invention and Comparative Example Nos. 1 and 2 were installed to an engine-testing bench. Note that the catalysts according to Example Nos. 1 through 3 were installed to the engine-testing bench so that the larger-pore-volume portion 11 was disposed on an exhaust-gas-flow upstream side. Then, in an atmosphere in which the air-fuel ratio A/F was fluctuated between 14 and 15 at a cycle of 1 Hz, the respective catalysts according to Example Nos. 1 through 3 and Comparative Example Nos. 1 and 2 were subjected to a durability test in which exhaust gases were distributed through the respective catalysts at an inlet temperature of 950° C. for 50 hours. Thereafter, under the same conditions, the respective catalysts according to Example Nos. 1 through 3 and Comparative Example Nos. 1 and 2 were measured for HC conversions continuously from room temperature to 400° C. Thus, the respective catalysts according to Example Nos. 1 through 3 and Comparative Example Nos. 1 and 2 were examined for temperatures at which they could purify HCs by 50% (hereinafter referred to as "50%-HCs-conversion temperatures"), and for times until the catalysts attained the 50%-HCs-conversion temperatures (hereinafter referred to as "warming-up characteristics"). Table 1 below sets forth the examination results.

portion 12; and that, as a result, the resulting catalytic coating layers were thickened on the exhaust-gas-flow upstream side of the catalysts and were thinned out on the exhaust-gas-flow downstream side thereof, respectively. Specifically, in the catalysts according to Example No. 1 through 3, the catalytic coating layers were thick on the exhaust-gas-flow upstream side, and were thin on the exhaust-gas-flow downstream side. Accordingly, the heat of reactions on the exhaust-gas-flow upstream side were likely to dissipate to the exhaust-gas-flow downstream side. Consequently, it is believed that the catalytic coating layers of the catalysts according to Example Nos. 1 through 3 were inhibited from deteriorating during the durability test.

Example No. 4

Figure 2:
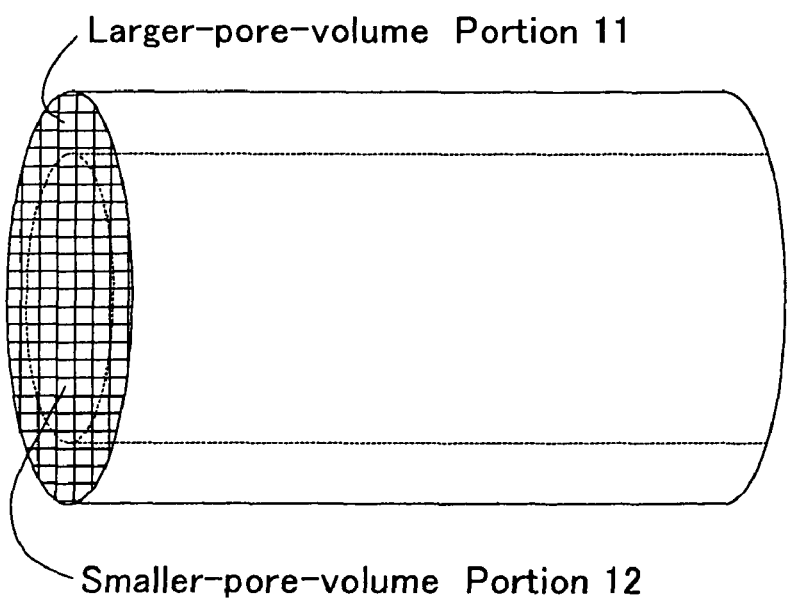
FIG. 2 is a perspective diagram for illustrating a honeycomb-shaped substrate according to Example No. 4 of the present invention.

FIG. 2 illustrates a honeycomb-shaped substrate according to Example No. 4 of the present invention. As shown in the drawing, the honeycomb-shaped substrate according to Example No. 4 is provided with a larger-pore-volume portion 11, which is disposed on the outer periphery, and a smaller-pore-volume portion 12, which is disposed on the inner periphery.

Using the same compound as employed in Example No. 1, a honeycomb-shaped molded workpiece was produced by extrusion molding. The resulting molded workpiece was dried to obtain a dried workpiece. Then, the dried workpiece was masked partially over a range of 7 mm diametrically inward from the outer peripheral surface on the opposite end surfaces. Thereafter, the inner periphery of the masked workpiece, that is, the unmasked inner periphery thereof in which the cellular openings were exposed, was impregnated with an aqueous solution of an alkaline sintering facilitating agent. Finally, the workpiece with only the inner periphery impregnated was calcined in the same manner as described in Example No. 1. Thus, a honeycomb-shaped substrate according to Example No. 4 of the present invention was produced. The resultant honeycomb-shaped substrate according to Example No. 4 had a diameter of 35 mm, a length of 50 mm,

TABLE 1

| | Larger-pore-volume Portion | | | Smaller-pore-volume Portion | | | | |
|---|---|---|---|---|---|---|---|---|
| | Length (mm) | Pore Volume (c.c./g) | Averaged Coating Layer's Thickness (μm) | Length (mm) | Pore Volume (c.c./g) | Averaged Coating Layer's Thickness (μm) | Warming-up Characteristic (sec.) | 50%-HCs-conversion Temp. (° C.) |
| Ex. No. 1 | 9 | 0.118 | 34 | 41 | 0.075 | 18 | 15 | 362 |
| Ex. No. 2 | 22 | 0.118 | 30 | 28 | 0.059 | 14 | 12 | 349 |
| Ex. No. 3 | 36 | 0.118 | 26 | 14 | 0.041 | 8 | 19 | 376 |
| Comp. Ex. No. 1 | 50 | 0.118 | 21 | None | None | None | 23 | 385 |
| Comp. Ex. No. 2 | None | None | None | 50 | 0.075 | 21 | 24 | 390 |

It is appreciated from Table 1 that the catalysts according to Example Nos. 1 through 3 of the present invention exhibited better warming-up characteristics than the catalysts according to Comparative Example Nos. 1 and 2 did. In other words, the catalysts according to Example Nos. 1 through 3 could purify HCs efficiently from a low-temperature region. It is apparent that the advantage resulted from the arrangements that the honeycomb-shaped substrates of the catalysts according to Example No. 1 through 3 were provided with the larger-pore-volume portion 11 and smaller-pore-diameter cross-sectionally-quadrangled cells in a quantity of 600 cells per square inch, and a cellular wall thickness of 90 μm.

The thus produced honeycomb-shaped substrate according to Example No. 4 of the present invention was measured for pore volumes with a mercury porosimeter. Note the measured pore volumes were exhibited by fine pores, whose pore diameters were 2 μm or less and which were present in the cellular walls falling in the range being impregnated with the aqueous solution and in the cellular walls falling in the range being not subjected to the impregnation. According to the measurement, as illustrated in FIG. 2, the honeycomb-shaped substrate according to Example No. 4 was provided with a larger-pore-volume portion 11 in the outer periphery and a smaller-pore-volume portion 12 in the inner periphery. The larger-pore-volume portion 11 exhibited a pore volume of 0.118 c.c./g. The smaller-pore-volume portion 12 exhibited a pore volume of 0.075 c.c./g.

Subsequently, 80 parts by weight of a catalytic powder, 4 parts by weight of an alumina powder, 200 parts by weight of an alumina sol, 6 parts by weight of acetic acid, and 20 parts by weight of water were mixed by stirring. Note that the catalytic powder comprised a ceria-zirconia composite oxide powder with Pt and Rh loaded in advance. The resulting mixture was subjected to milling with a ball mill, thereby preparing a slurry.

The thus prepared slurry was wash coated onto the honeycomb-shaped substrate according to Example No. 4 of the present invention. After removing the excessive slurry from the honeycomb-shaped substrate according to Example No. 4 by blowing air to it, the honeycomb-shaped substrate was dried at 120° C. for 6 hours, and was then calcined at 400° C. for 3 hours, thereby forming a catalytic coating layer.

The resulting catalyst according to Example No. 4 of the present invention had a catalytic coating layer whose thickness was thicker on the outer peripheral side but was thinner on the inner peripheral side. Specifically, the catalytic ingredients were loaded more on the outer peripheral side, but were loaded less on the inner peripheral side. Accordingly, the reactivities of the catalytic coating layer's outer periphery, which had been less likely to be warmed up by exhaust gases, enhanced, and thereby the resulting reaction heat improved the warming-up characteristic of the catalytic coating layer's outer periphery. Consequently, compared with catalysts in which the catalytic ingredients were loaded uniformly as a whole, the resultant catalyst according to Example No. 4 exhibited upgraded purifying performance in a low-temperature region.

Other Mode for Examples

Upon wash coating a slurry, there has been a phenomenon that the slurry's surface tension thickens the thickness of the resulting coating layer at around the corners of the cellular walls. Accordingly, there might arise a case that, at around the corners of the cellular walls, it is not possible to make use of catalytic ingredients, which exist deep inside the corners of the resultant coating layer. Moreover, because of the thickened thickness at around the corners of the cellular walls, the coating layer might be subjected to larger thermal stresses. Consequently, there might be a case that cracks or come-off occur at around the corners of the cellular walls in the resulting coating layer.

Note that the above-described honeycomb-shaped substrates according to Example Nos. 1 through 4 exhibit pore volumes, which differ in the axial direction or in the diametric direction. However, it is preferable as well to impregnate only the cross-sectionally cross-shaped intersections of a honeycomb-shaped substrate's cellular walls with an aqueous solution of a sintering facilitating agent while inhibiting the flats of the cellular walls from being impregnated with the aqueous solution, and then to calcine the thus impregnated honeycomb-shaped substrate. In the thus produced honeycomb-shaped substrate, the resulting coating layer has thinned thicknesses at around the corners of the cellular walls and has thickened thicknesses at the flats, because the resultant coating layer exhibits smaller pore volumes at around the corners of the cellular walls and exhibits larger pore volumes at the flats of the cellular walls. Therefore, the honeycomb-shaped substrate according to the other mode for the examples of the present invention can solve such problems as described immediately above.

Having now fully described the present invention, it will be apparent to one of ordinary skill in the art that many changes and modifications can be made thereto without departing from the spirit or scope of the present invention as set forth herein including the appended claims.

What is claimed is:

1. A honeycomb-shaped straight-flow structure for a catalyst, comprising:
    a plurality of cellular walls
    a plurality of cellular passages demarcated by the cellular walls, said cellular passages having inlets and outlets, wherein said inlets and outlets of each cellular passage are open-ended, and
    wherein a plurality of pores exhibiting unequal pore volumes are defined in portions of the cellular walls having a first side demarcating one of the cellular passages and a second side opposite the first side and demarcating another of the cellular passages, the pore volumes being greater on an exhaust-gas-flow upstream side of the honeycomb-shaped straight-flow structure than on an exhaust-gas-flow downstream side thereof; and
    a coating layer coating a surface of the cellular walls and the pores of the honeycomb-shaped straight-flow structure, wherein the coating layer has a thickness on the exhaust-gas-flow upstream side of the honeycomb-shaped straight-flow structure greater than a thickness on the exhaust-gas-flow downstream side thereof.

2. The honeycomb-shaped straight-flow structure for a catalyst, according to claim 1, wherein: the pore volumes are exhibited by fine pores whose pore diameters are 2 μm or less.

3. A catalyst for purifying exhaust gases, comprising:
    a honeycomb-shaped straight-flow structure, comprising:
        a plurality of cellular walls;
        a plurality of cellular passages demarcated by the cellular walls, said cellular passages having inlets and outlets, wherein said inlets and outlets of each cellular passage are open-ended, and
        wherein a plurality of pores exhibiting unequal pore volumes are defined in portions of the cellular walls having a first side demarcating one of the cellular passages and a second side opposite the first side and demarcating another of the cellular passages, the pore volumes being greater on an exhaust-gas-flow upstream side of the honeycomb-shaped straight-flow structure than on an exhaust-gas-flow downstream side thereof; and
        a coating layer coating a surface of the cellular walls and the pores of the honeycomb-shaped straight-flow structure, wherein the coating layer has a thickness on the exhaust-gas-flow upstream side of the honeycomb-shaped straight-flow structure greater than a thickness on the exhaust-gas-flow downstream side thereof; and
    a catalytic ingredient is loaded on the coating layer.

4. The catalyst according to claim 3, wherein: the cellular walls have pore volumes greater on an outer peripheral side of the honeycomb-shaped straight-flow structure than on an inner peripheral side thereof; and
    the coating layer has a thickness on the outer peripheral side of the honeycomb-shaped straight-flow structure greater than a thickness on the inner peripheral side thereof.

5. The catalyst according to claim 3, wherein:
the cellular walls have pore volumes greater at flat portions of the cellular walls than at proximate corners of the cellular walls; and
the coating layer has a thickness at the flat portions of the cellular walls greater than a thickness at the proximate corners of the cellular walls.

6. A honeycomb-shaped straight-flow structure for a catalyst, comprising:
a plurality of cellular walls;
a plurality of cellular passages demarcated by the cellular walls, wherein said cellular passages are open-ended,
wherein a first plurality of pores are defined in outer portions of the cellular walls having a first side demarcating one of the cellular passages and a second side opposite the first side demarcating another of the cellular passages, and a second plurality of pores are defined in inner portions of the cellular walls having a first side demarcating one of the cellular passages and a second side opposite the first side demarcating another of the cellular passages, the outer portions of the cellular walls being closer than the inner portions of the cellular walls to a perimeter of the honeycomb-shaped straight-flow structure, and pore volumes of the first plurality of pores being greater than pore volumes of the second plurality of pores; and
a coating layer coating a surface of the cellular walls and the pores of the honeycomb-shaped straight-flow structure wherein the coating layer has a thickness on the outer portions of the cellular walls greater than a thickness on the inner portions of the cellular walls.

7. The honeycomb-shaped straight-flow structure for a catalyst, according to claim 6, wherein the pore volumes are exhibited by fine pores having pore diameters of 2 μm or less.

8. A catalyst for purifying exhaust gases, comprising:
a honeycomb-shaped straight-flow structure, comprising:
a plurality of cellular walls;
a plurality of cellular passages demarcated by the cellular walls, wherein said cellular passages are open-ended,
wherein a first plurality of pores are defined in outer portions of the cellular walls having a first side demarcating one of the cellular passages and a second side opposite the first side demarcating another of the cellular passages, and a second plurality of pores are defined in inner portions of the cellular walls having a first side demarcating one of the cellular passages and a second side opposite the first side demarcating another of the cellular passages, the outer portions of the cellular walls being closer than the inner portions of the cellular walls to a perimeter of the honeycomb-shaped straight-flow structure, and pore volumes of the first plurality of pores being greater than pore volumes of the second plurality of pores; and
a coating layer coating a surface of the cellular walls and the pores of the honeycomb-shaped straight-flow structure wherein the coating layer has a thickness on the outer portions of the cellular walls greater than a thickness on the inner portions of the cellular walls; and
a catalytic ingredient is loaded on the coating layer.

9. The honeycomb-shaped straight-flow structure for a catalyst, according to claim 1, wherein:
the cellular walls have pore volumes greater on an outer peripheral side of the honeycomb-shaped straight-flow structure than on an inner peripheral side thereof; and
the coating layer has a thickness on the outer peripheral side of the honeycomb-shaped straight-flow structure greater than a thickness on the inner peripheral side thereof.

10. The honeycomb-shaped straight-flow structure for a catalyst, according to claim 1, wherein:
the cellular walls have pore volumes greater at flat portions of the cellular walls than at proximate corners of the cellular walls; and
the coating layer has a thickness at the flat portions of the cellular walls greater than a thickness at the proximate corners of the cellular walls.

11. The catalyst according to claim 3, wherein:
the pore volumes are exhibited by fine pores having pore diameters of 2 μm or less.

12. The honeycomb-shaped straight-flow structure for a catalyst, according to claim 6, wherein:
the cellular walls have pore volumes greater on an exhaust-gas-flow upstream side of the honeycomb-shaped straight-flow structure than on an exhaust-gas-flow downstream side thereof; and
the coating layer has a thickness on the exhaust-gas-flow upstream side of the honeycomb-shaped straight-flow structure greater than a thickness on the exhaust-gas-flow downstream side thereof.

13. The honeycomb-shaped straight-flow structure for a catalyst, according to claim 6, wherein:
the cellular walls have pore volumes greater at flat portions of the cellular walls than at proximate corners of the cellular walls; and
the coating layer has a thickness at the flat portions of the cellular walls greater than a thickness at the proximate corners of the cellular walls.

14. The catalyst according to claim 8, wherein:
the pore volumes are exhibited by fine pores having pore diameters of 2 μm or less.

15. The catalyst according to claim 8, wherein:
the cellular walls have pore volumes greater on an exhaust-gas-flow upstream side of the honeycomb-shaped straight-flow structure than on an exhaust-gas-flow downstream side thereof; and
the coating layer has a thickness on the exhaust-gas-flow upstream side of the honeycomb-shaped straight-flow structure greater than a thickness on the exhaust-gas-flow downstream side thereof.

16. The catalyst according to claim 8, wherein:
the cellular walls have pore volumes greater at flat portions of the cellular walls than at proximate corners of the cellular walls; and
the coating layer has a thickness at the flat portions of the cellular walls greater than a thickness at the proximate corners of the cellular walls.

17. The honeycomb-shaped straight-flow structure for a catalyst, according to claim 1, wherein the coating layer is composed of an identical material along an entire length of the honeycomb-shaped straight-flow structure.

18. The catalyst according to claim 3, wherein the coating layer is composed of an identical material along an entire length of the honeycomb-shaped straight-flow structure.

19. The honeycomb-shaped straight-flow structure for a catalyst, according to claim 6, wherein the coating layer is composed of an identical material along an entire length of the honeycomb-shaped straight-flow structure.

20. The catalyst according to claim 8, wherein the coating layer is composed of an identical material along an entire length of the honeycomb-shaped straight-flow structure.

* * * * *